Dec. 18, 1962  C. E. ADLER  3,068,718
BOWDEN CABLE DRIVE FOR POSITIONING A SETTABLE MEMBER
Filed Sept. 18, 1959  5 Sheets-Sheet 1
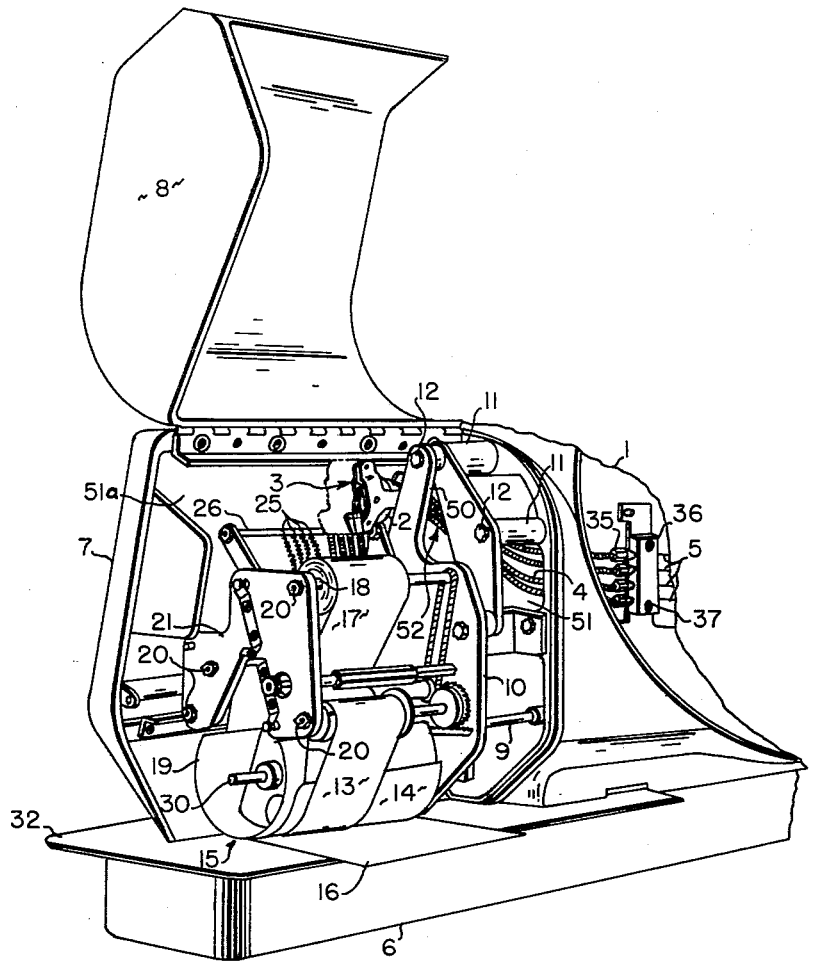
Fig. I
INVENTOR.
CLARENCE E. ADLER
BY
Marshall, Marshall & Yeasting
ATTORNEYS Dec. 18, 1962  C. E. ADLER  3,068,718
BOWDEN CABLE DRIVE FOR POSITIONING A SETTABLE MEMBER
Filed Sept. 18, 1959  5 Sheets—Sheet 2
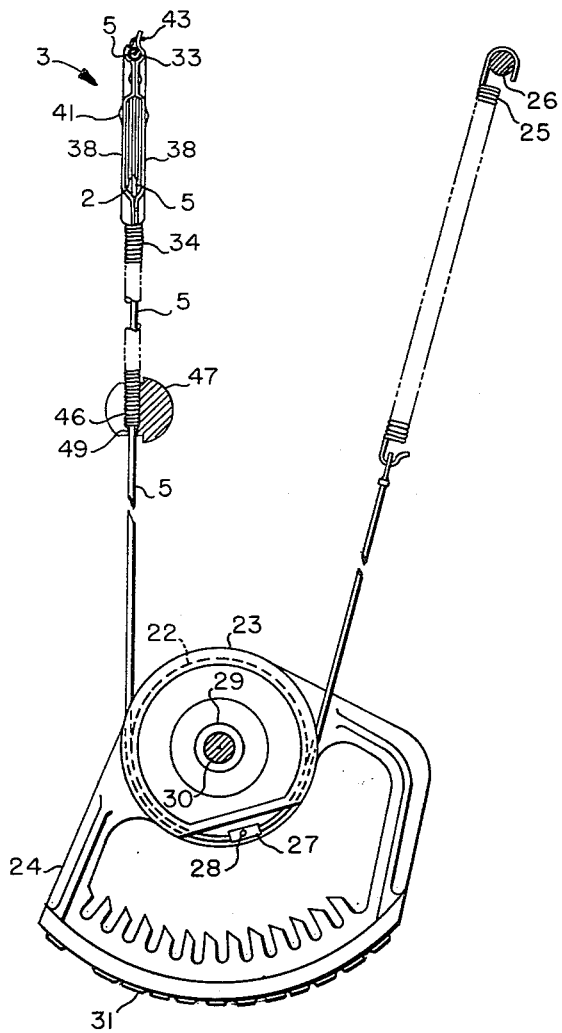
_Fig. II_
INVENTOR.
CLARENCE E. ADLER
BY
Marshall, Marshall & Yeasting
ATTORNEYS Dec. 18, 1962        C. E. ADLER        3,068,718
BOWDEN CABLE DRIVE FOR POSITIONING A SETTABLE MEMBER
Filed Sept. 18, 1959        5 Sheets-Sheet 3
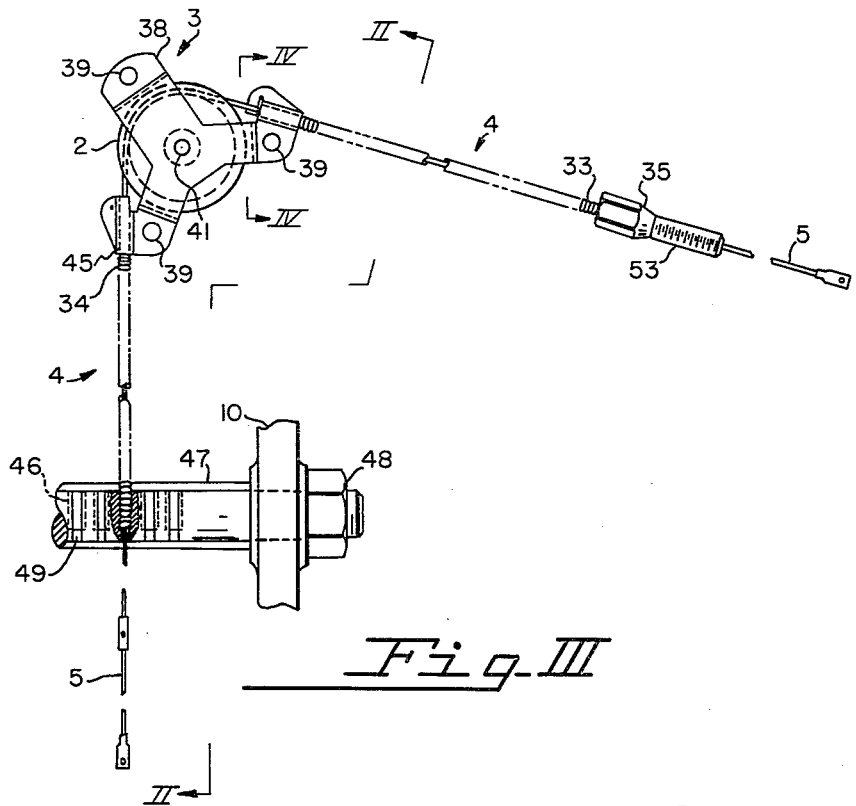
Fig. III
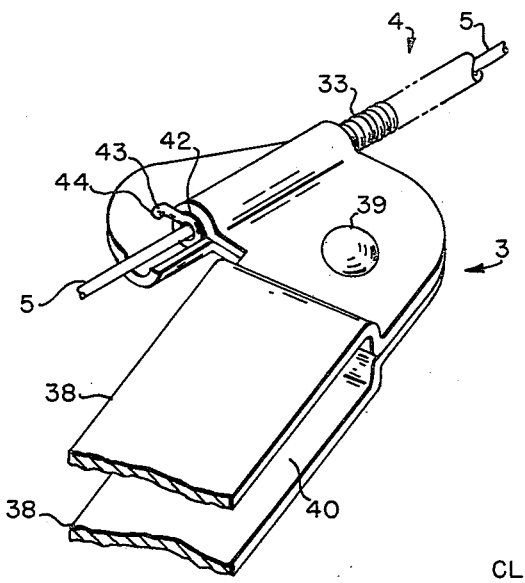
Fig. IV
INVENTOR.
CLARENCE E. ADLER
BY
Marshall, Marshall & Yeasting
ATTORNEYS Dec. 18, 1962  C. E. ADLER  3,068,718
BOWDEN CABLE DRIVE FOR POSITIONING A SETTABLE MEMBER
Filed Sept. 18, 1959  5 Sheets-Sheet 4
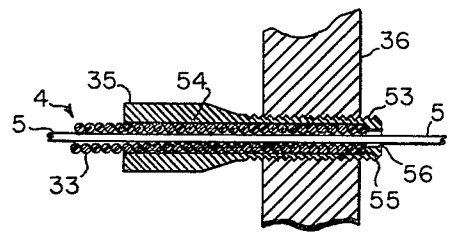
_Fig. V_
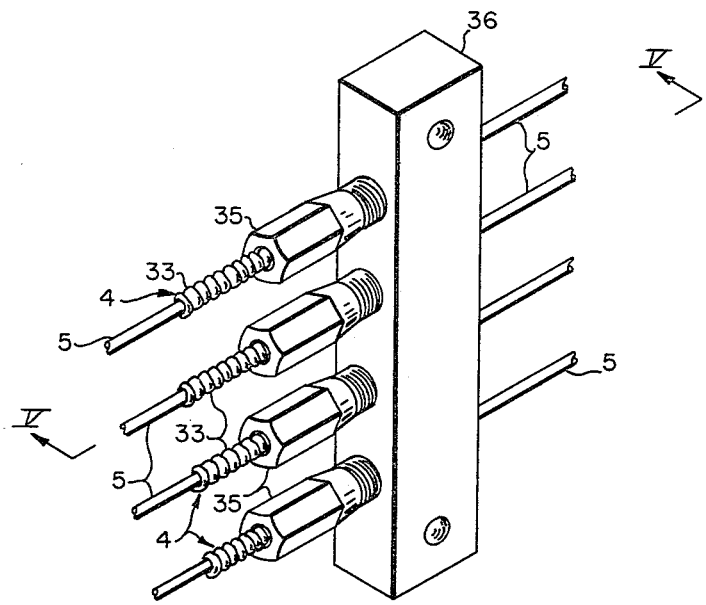
_Fig. VI_
INVENTOR.
CLARENCE E. ADLER
BY
Marshall, Marshall & Yeasting
ATTORNEYS Dec. 18, 1962  C. E. ADLER  3,068,718
BOWDEN CABLE DRIVE FOR POSITIONING A SETTABLE MEMBER
Filed Sept. 18, 1959  5 Sheets-Sheet 5
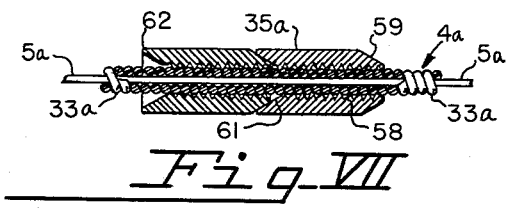
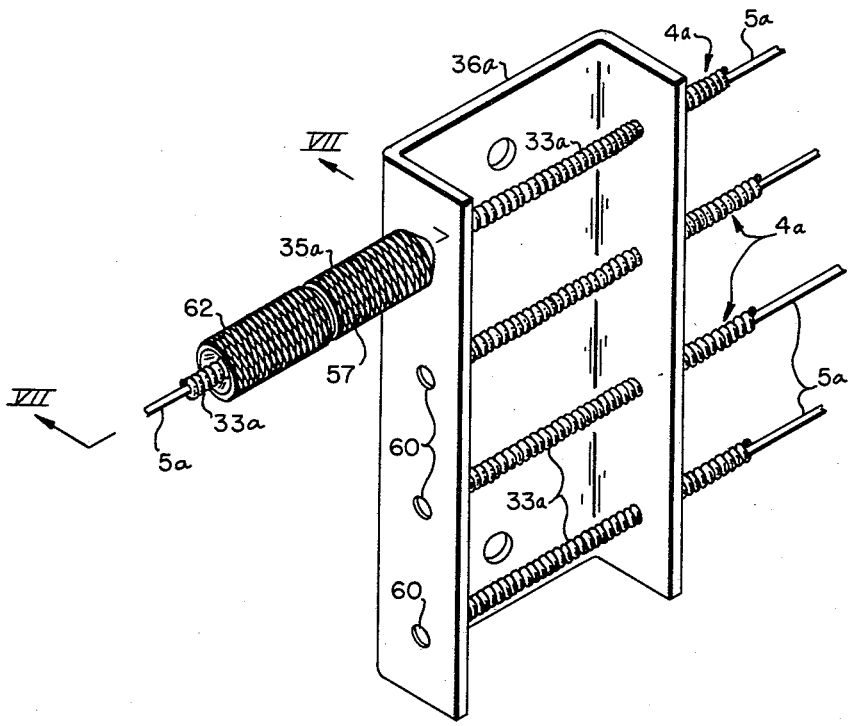
INVENTOR.
CLARENCE E. ADLER
BY
ATTORNEYS

United States Patent Office 3,068,718
Patented Dec. 18, 1962

3,068,718
BOWDEN CABLE DRIVE FOR POSITIONING A SETTABLE MEMBER
Clarence E. Adler, Toledo, Ohio, assignor to Toledo Scale Corporation, Toledo, Ohio, a corporation of Ohio
Filed Sept. 18, 1959, Ser. No. 840,886
5 Claims. (Cl. 74—501)

This invention relates to an improved Bowden cable drive for positioning settable members in instruments, such as type sectors or wheels in printers, and to improved means for adjusting a Bowden cable drive.

The Bowden cable drive is an improvement on the Bowden cable drive which is shown and described in U.S. application Serial No. 693,975, filed on November 1, 1957, in the names of C. E. Adler and G. T. Gray, now Patent No. 2,922,361. Such application discloses a printer having type bearing printing sectors which are set up by means of Bowden cable drives that operatively connect the printing sectors to a mechanical chart reading device used in connection with a weighing scale to read the graduations of a chart that moves according to the weight of a load being weighed and to set up the printer for printing the weight indications in digital form. The cables and their casings in the printer which is disclosed in the copending application are led from the mechanical chart reading device to the type bearing printing sectors in the printer in paths each of which includes a curved portion (designated as bends or loops 172 in FIG. XV and also shown in FIG. XVI of the copending application) having a relatively large radius of curvature. It was found that a great deal of friction occurred between the cables and their casings in the curved portions of the paths causing sticking of the cable drives when operated by driving means of reasonable size.

It is, accordingly, the principal object of this invention to provide an improved Bowden cable drive for positioning a member in an instrument, such as a type sector or a wheel in a printer, which develops relatively little friction between the cable and its casing.

Another object of the invention is to provide an improved means for adjusting a Bowden cable drive whereby an element in an instrument, such as a type sector or a wheel in a printer, which is set up by means of the drive is set up accurately.

A further object is to provide Bowden cable drives in a printer for setting up the type sectors or wheels in the printer which are of simple, rugged and low cost construction and yet are operable with little friction between the cables and their casings.

Still another object is to provide Bowden cable drives in a printer for setting up the type sectors or wheels in the printer accurately to produce well aligned printed matter.

Other objects and advantages will be apparent from the following description in which reference is had to the accompanying drawings.

A preferred form of the improved Bowden cable drive and preferred forms of the improved means for adjusting a Bowden cable drive are illustrated in the accompanying drawings.

In the drawings:

FIG. I is a perspective view of a printer mounted on the broken away dial housing of a weighing scale with the case of the printer opened up to reveal the Bowden cable drive of the invention;

FIG. II is a sectional view taken along the line II—II of FIG. III;

FIG. III is an enlarged, fragmentary, elevational view of the Bowden cable drive as seen looking into the open printer case illustrated in FIG. I, certain adjuncts being omitted for clarity of illustration;

FIG. IV is an enlarged sectional view in perspective taken along the line IV—IV of FIG. III;

FIG. V is a sectional view taken along the line V—V of FIG. VI;

FIG. VI is an enlarged perspective view of that part of the cable adjustment mechanism of the invention which is shown at the right hand edge of FIG. I;

FIG. VII is a sectional view taken along the line VII—VII of FIG. VIII; and

FIG. VIII is a view which corresponds to FIG. VI of a modified cable adjustment mechanism.

These specific figures and the accompanying description are intended merely to illustrate the invention and not to limit its scope.

For the purpose of illustration, the Bowden cable drive and the adjustment means for a Bowden cable drive of the invention are shown in connection with the printer which is shown and described in the foregoing mentioned U.S. application Serial No. 693,975. FIG. I of the present application corresponds to FIG. XV in the copending application. The printer is shown in the copening application in connection with a mechanical chart reading device that is described in connection with its use in an ordinary dial type weighing scale for reading the graduations of a chart that moves according to the weight of a load being weighed and for setting up the printer for printing weight indications in digital form. The printer, however, may be operated by any of the usual means for setting up printing members, such as type wheels or sectors, or by hand. It is to be understood that the Bowden cable drive and the adjustment means for a Bowden cable drive of the invention are useful not only in printers, but in instruments of all kinds wherein settable members are positioned. Such a weighing scale comprises a dial housing 1 that contains automatic load counterbalancing and indicating mechanism which as shown in the copending application includes a chart that is rotated through increments of angle that are proportional to increments of weight applied to the scale and mechanical chart reading mechanism for reading the chart and setting up the printer for printing weight indications in digital form.

The copending application discloses the printer as having type bearing printing sectors which are set up by means of Bowden cable drives that operatively connect the printing sectors to the mechanical chart reading device and that are led from the mechanical chart reading device to the printing sectors in paths each of which includes a curved portion (designated as bends or loops 172 in FIG. XV are also shown in FIG. XVI of the copending application) having a relatively large radius of curvature. It was found that a great deal of friction occurred between the cables and their casings in the curved portions of the paths. The Bowden cable drives of the invention each include a floating idler sheave 2 in the curved portion of the path, the sheave 2 being journaled in a bracket assembly 3 which is floatingly supported between separated ends of the cable casing 4. Cables 5 run over the sheaves 2, the sheaves functioning to greatly reduce the radii of curvature of the curved portions of the paths and greatly reducing the friction in the system.

The printing mechanism is contained within its housing 6 and case 7, the case having a door 8 which is shown in FIG. I in its open position to reveal the interior of the case. The printer is driven by means of a horizontal motor driven shaft 9 that is turned one complete revolution for each printing cycle. The shaft 9 extends from the dial housing 1 into the printer case 7 to drive the mechanism therein and also is gear connected as shown in the aforegoing U.S. application 693,975 to drive that part of the printer mechanism (roller printer) contained within the printer housing 6, the shaft 9 being journaled withing the printer case 7 in a vertical end frame 10. Horizontal, sleeve-like spacers 11, two of which are shown in FIG. I, space the vertical end frame 10 from the dial housing 1, bolts 12 which extend through the sleeve-like spacers 11 functioning to attach the end frame to the dial housing.

The shaft 9 drives, as shown and described in detail in the foregoing U.S. application 693,975, an inked ribbon 13 which is moved back and forth around a curved guide strip 14 carried by the end frame 10 through a printing station 15 in juxtaposition to an element 16 to be printed, such as a ticket, and a translucent record strip 17 which is wound upon a spool 18 and which is guided by means of a curved guide strip 19 that is in very slightly spaced relationship with the guide strip 14 and that also is carried by the end frame 10, the record strip 17 being moved between the spaced guide strips 14 and 19 in juxtaposition to the inked ribbon 13 in the printing station 15. The guide strips 14 and 19 are provided with openings, not shown, which define the printing station 15. The inked ribbon 13 and the record strip 17 are carried each on a pair of shafts 20 which extend from the vertical end frame 10 and which have their free ends journaled in a removable end plate 21.

Each of the cables 5, there being one for each decade in a four place number, after running over its floating sheave 2, is run down around a circular groove 22 (FIG. II) in a hub 23 on a printing sector 24 and back up to a return spring 25 which is hooked on a horizontal rod 26 that extends from the end frame 10. The rod 26 and the four return springs 25, one for each of the four cables 5, are shown in FIG. I. The bottoms of the sectors 24 are located just above the guide strip 19 in juxtaposition with the record strip 17 in the printing station 15. A ferrule 27 on each of the cables 5 is flattened and a pin 28 through the ferrule fixedly attaches the cable 5 to its printing sector 24. The four printing sectors 24 each is provided with a press-fitted bearing 29 and are rotatably mounted on a stationary sector shaft 30 (FIGS. I and II) extending horizontally from the end frame 10. Printing type 31 are formed on the peripheries of the sectors 24, for example, by engraving.

In operation, the ticket or other element 16 is placed on a table 32 which forms the top of the housing 6 and which has an opening at the printing station 15 through which the roller printer in the housing 6 can contact the ticket 16, the printing sectors 24 are set up for printing by being pivoted clockwise, as viewed in FIG. II, about the axis of the sector shaft 30 by the cables 5 which are operated by the chart reading device in opposition to the return springs 25, and the drive shaft 9 is turned one revolution. Movement of the shaft 9 moves the inked ribbon 13, the record strip 17 and then the roller printer. The roller printer presses the ticket 16 against the inked ribbon 13, the inked ribbon against the translucent record strip 17, and the record strip against the face of the type 31. Since the inked ribbon is pinched between the ticket 16 and the translucent record strip 17, an inked imprint is made on the ticket and a similar inked imprint is made on the continuous strip for record purposes, the imprint on the ticket being read directly while the imprint on the record strip is read through the translucent strip from the back or unprinted side of the strip. In lieu of the roller printer, any means, such as a printer of the hammer type, may be used to press an element to be printed against the printing characters.

Each of the cable casings 4 is divided into two sections 33 and 34 (FIG. III). The right hand end of cable casing section 33 as viewed in FIGS. I and III is attached by means of an adjustment nut 35 to a block 36 which is secured by means of screws 37 within the dial housing 1. The left hand end of such cable casing section 33 is attached as shown in detail in FIG. IV to its bracket assembly 3 which includes a pair of brackets 38 that are riveted tightly together in three places at 39 (FIG. III) and that are bent out and away from the riveted places to form a space 40 in which the idler sheave 2 is rotatably mounted on a pin 41. The brackets 38 are so formed that together they define an opening 42 which receives the end of such cable casing section 33 and in which such end is clamped, a tab 43 on such end of the cable casing section 33, which is an unwound end of the cable casing section 33, being hooked in a hole 44 in one of the brackets 38 to anchor the cable casing in the bracket assembly 3.

The upper end of the cable casing section 34 as viewed in FIG. III is anchored in the bracket assembly 3 in the same manner as is the end of the cable casing section 33, the brackets 38 being so formed that together they define an opening 45 (FIG. III) which is the same as the opening 42 and which receives the cable casing section 34 and in which the cable casing section 34 is clamped and at which the cable casing section is hooked. The lower end of section 34 of the cable casing 4 as viewed in FIG. III is butted against the bottom of one of a series of holes 46 in a cable guide shaft 47 which is attached by means of a nut 48 threaded on one of its ends to the end frame 10. Each of the holes 46 communicates with a slot 49 in the cable guide shaft 47. The bottoms of the holes 46 support the ends of the cable casing sections 34 and the slots 49 allow the cables 5 to continue on through the guide shaft. More holes 46 and slots 49 are provided than is necessary for the four sets of cables and casings so that additional cables and casings can be added and so that there are sets of holes and slots conveniently located for all of the possible positions of the cables and casings.

The cables 5 run from the dial housing 1 each through its cable casing section 33, around its idler sheave 2, through its cable casing section 34, down around the circular groove 22 in the hub 23 of the printing sector 24 to which is attached and back up to its return spring 25 as hereinbefore described. The bracket assemblies 3 together with their sheaves 2 are floatingly supported in side by side relationship by the cable casing sections 33 and 34 and are free to flop back and forth within the limits defined by an ear 50 (FIG. I) on the end frame 10 and a stationary side 51a of the printer case 7. Ordinarily, because of the location of the cable guide shaft 47 relative to the ear 50 of the end frame 10, the floating bracket assemblies 3 are urged resiliently by the cable casings 4 toward such ear 50. The cable casings 4 extend through an opening 51 in the dial housing 1 in bends or loops 52. As shown in FIG. III, the sheaves 2 are each located intermediate the ends of a loop 52. A loop 52 consists of substantially straight cable casing sections 33 and 34 which are joined together by means of a sheave 2. This is in contrast to prior single section Bowden cable casings which do not contain idler sheaves intermediate their ends and, therefore, are bent in loops in which heavy friction is generated between the cable casings and the cables. Since the cable casing sections 33 and 34 are substantially straight and the cables 5 run over the floating idler sheaves 2, relatively little friction is generated between the cable casings 4 and their cables 5.

The radii of the bends or loops 52 are changed by adjustment of the adjustment nuts 35 which are shown in detail in FIGS. V and VI to shift the ends of the cable casings 4 at the nuts 35 one way or the other. Each of the adjustment nuts 35 has a threaded exterior portion 53 which is threaded in the block 36 and a sleeve-like interior portion 54 having an abutment end 55 in which a relatively small hole 56 is formed. The end of the cable casing section 33 is received by the sleeve-like interior portion 54 of the adjustment nut 35 and the tip of such cable casing section 33 is butted against the abutment end 55 of the adjustment nut, the hole 56 in the adjustment nut permitting the cable 5 to continue on through the adjustment nut. Movement of the adjustment nuts 35 to the left as viewed in FIGS. V and VI forces the ends of the cable casing sections 33 contained therein to the left. Movement of the adjustment nuts 35 to the right permits the ends of the cable casing sections 33 contained therein to move under their own spring force to the right, i.e., the tips of the cable casing sections 33 are always butted against the abutment ends 55 of the adjustment nuts. Such shifting of the cable casings 4 does not change the positions of the other ends of the cable casings which are stationary in the bottoms of the holes 46 in the stationary cable guide shaft 47. The changing of the radii of the bends or loops 52 changes the lengths of the paths in which the cables 5 travel from the mechanical chart reading device within the dial housing 1 to the printing sectors 24. Since only the lengths of the paths are changed and not the lengths of the cables 5, the ends of which that are connected to the chart reading device being stationary for adjustment purposes, such adjustment of the radii of the loops 52 of the cable casings 4 cause the cables 5 to adjust the positions of the printing sectors 24.

In operation, a print is made on the ticket 16 and an inspection is made of the alignment of the numbers in the four place number. This alignment is adjusted by trial and error adjustment of the adjustment nuts 35 to adjust the printing positions of the printing sectors 24 until the numbers are printed in a straight, even row. The cable adjustment mechanism is operable to adjust the printing not only of numbers but the printing of well aligned printed matter of all types.

A modified cable adjustment mechanism is illustrated in FIGS. VII and VIII; similar reference number in FIGS. VII and VIII and in FIGS. I–VI identify parts which are alike in structure and in function. The radii of the bends or loops in the cable casings can be changed by adjustment of the adjustment nuts 35a to shift the ends of the cable casings 4a at the nuts 35a one way or the other. Each of the adjustment nuts 35a has a knurled exterior 57 and an interior threaded portion 58 which is threaded on the end of the cable casing section 33a, the right hand end 59 of the nut 35a being urged against the member 36a by means of the spring force of the bent cable casing and the cable casing together with its cable continuing on through the member 36a through a pair of aligned holes 60 in the member 36a. The right hand end 59 of the nut 35a is in the shape of a truncated cone and the left hand end 61 is countersunk. A lock nut 62 is provided; it is a duplicate of the adjustment nut 35a. The lock nut 62 is turned until its truncated cone shaped end is received in the countersunk end 61 of the adjustment nut 35a; this keeps the adjustment nut 35a from turning on the cable casing. The duplicate structures of the adjustment nuts 35a and of the lock nuts 62 reduce the cost of manufacture and of parts inventory. When the lock nuts 62 are loosened, the adjustment nuts 35a can be turned one way or the other to feed the cable casings to the left or to the right as viewed in FIGS. VII and VIII to increase or decrease the lengths of the paths in which the cables 5a travel from the mechanical chart reading device to the printing sectors. This adjusts the printing positions of the printing sectors in the same manner as the adjustments of the adjustment nuts 35 adjusts the printing positions of the printing sectors.

The embodiments of the invention described in connection with the drawings are to be regarded as illustrative only since the invention is susceptible to variation, modification and change within the spirit and scope of the appended claims.

Having described the invention, I claim:

1. In an instrument, in combination, a settable member, two sections of a cable casing, an idler sheave, sheave mounting means for rotatably mounting the sheave attached to an end of each of the cable casing sections, a support for each of the other ends of the cable casing sections, the sheave mounting means being floatingly supported in an upright position on the attached ends of the cable casing sections, means for confining the sheave mounting means between limits to maintain it upright, the sheave mounting means being freely movable between such limits, a cable which is attached to the settable member for driving it in a first direction and which runs through the cable casing sections and on the idler sheave, and means for driving the settable member in a return direction.

2. In an instrument, in combination, a settable member, two sections of a cable casing, an idler sheave, sheave mounting means for rotatably mounting the sheave attached to an end of each of the cable casing sections, a support for each of the other ends of the cable casing sections, the sheave mounting means being floatingly supported in an upright position on the attached ends of the cable casing sections, means for confining the sheave mounting means between limits to maintain it upright, the sheave mounting means being freely movable between such limits, a cable which is attached to the settable member for driving it in a first direction and which runs through the cable casing sections and on the idler sheave, means for driving the settable member in a return direction, and adjustment means cooperating with one of the cable casing sections for adjusting the position of the settable member.

3. An instrument according to claim 2 wherein the adjustment means includes an internally threaded adjustment nut threaded on an end of one of the cable casing sections, spring force provided by the cable casing urging a first end of the adjustment nut against one of the cable casing supports, such support defining a hole at the adjustment nut through which the cable and its casing extends, and wherein the first end of the adjustment nut is in the form of a truncated cone and the other end of the adjustment nut is countersunk and a lock nut is provided that is a duplicate of the adjustment nut and that is turned on the cable casing until its truncated cone-shaped end is received in the countersunk end of the adjustment nut to keep the adjustment nut, after it is adjusted, from turning on the cable casing.

4. An instrument according to claim 1 wherein the settable member is a printing member.

5. An instrument according to claim 1 wherein said instrument is a printer and the means for driving the settable member in a return direction includes a spring.

References Cited in the file of this patent

UNITED STATES PATENTS

| | | |
|---|---|---|
| 534,021 | Swan | Feb. 12, 1895 |
| 818,584 | Treatt | Apr. 24, 1906 |
| 1,562,120 | Nemcovsky | Nov. 17, 1925 |
| 1,585,976 | Groves et al. | May 25, 1926 |
| 1,607,751 | Rippingille | Nov. 23, 1926 |
| 1,795,267 | Stuart | Mar. 3, 1931 |
| 1,927,615 | Ponti et al. | Sept. 19, 1933 |
| 1,961,798 | Sneed | June 5, 1934 |
| 2,107,184 | Lasker | Feb. 1, 1938 |
| 2,180,442 | Tondeur | Nov. 21, 1939 |
| 2,730,134 | Morse | Jan. 10, 1956 |
| 2,818,801 | Hart et al. | Jan. 7, 1958 |
| 2,841,077 | Johnson et al. | July 1, 1958 |
| 2,899,835 | Moreland | Aug. 18, 1959 |
| 2,913,922 | Harker et al. | Nov. 24, 1959 |
| 2,922,361 | Adler et al. | Jan. 26, 1960 |

FOREIGN PATENTS

| | | |
|---|---|---|
| 819,398 | France | July 5, 1937 |
| 813,102 | Germany | Sept. 6, 1951 |
| 1,173,317 | France | Oct. 27, 1958 |